E. R. BANKS.
Coffee-Pots.
No. 218,214. Patented Aug. 5, 1879.
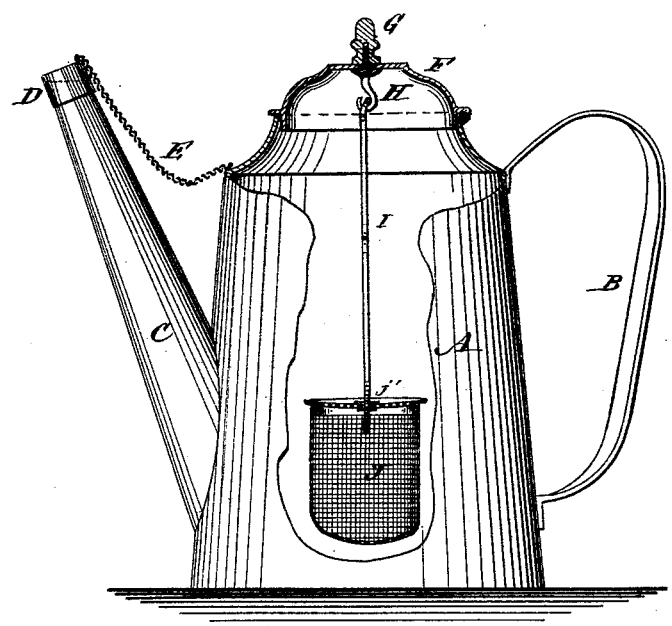

UNITED STATES PATENT OFFICE.

EDMUND R. BANKS, OF CYNTHIANA, KENTUCKY.

IMPROVEMENT IN COFFEE-POTS.

Specification forming part of Letters Patent No. 218,214, dated August 5, 1879; application filed May 23, 1879.

*To all whom it may concern:*

Be it known that I, EDMUND R. BANKS, of Cynthiana, in the county of Harrison and State of Kentucky, have invented a new and useful Improvement in Coffee and Tea Pots, of which the following is a specification.

The figure is a side view of a coffee-pot to which my improvement has been applied, part being broken away to show the construction.

Similar letters of reference indicate corresponding parts.

The object of this invention is to furnish coffee and tea pots which shall be so constructed that the coffee and tea can be steeped and the said pots placed upon the table without its being necessary to strain the said coffee and tea, and which shall be simple in construction and conveniently applied.

The invention consists in the combination of the jointed wire, having an eye upon its upper end and a screw-thread upon its lower end, and the screw-cover, with the wire-gauze cup or pocket to adapt it to be suspended detachably from a hook attached to the cover of a coffee or tea pot, as hereinafter fully described.

A represents the body of a coffee or tea pot. B is the handle. C is the spout. D is the spout-cap, which is connected with the body A by a small chain, E. F is the cover, which is hinged to the upper edge or breast of the body A, in the usual way. G is the knob, by means of which the cover F is opened and closed. H is a small hook, which is passed through a hole in cover F, and is screwed into the knob G to give it a firm support.

From the hook H is designed to be suspended by a jointed wire, I, a wire-gauze cup or pocket, J, into which the coffee or tea is placed to be steeped. With this construction the wire-gauze cup or pocket J and its contents can be detached before placing the pot on the table; or it may be placed upon the table without removing the said cup or pocket. This construction also allows the wire-gauze cup or pocket J to be readily removed to be emptied and cleaned.

The upper end of the jointed rod I has an eye formed upon it to receive the hook H, and its lower end has a screw-thread cut upon it and is screwed into the cover $j'$ of the pocket J, or is connected with the said cover by nuts. The cover $j'$ is made with a ring-flange, having a screw-thread cut upon it to screw into the mouth of the pocket J. With this construction the contents of the pocket J cannot escape into the water in the pot A, and can be raised and lowered, as desired.

This construction also allows the cover F to be turned back without detaching the pocket J, so that the liquid can drip from the contents of the said pocket.

Having thus described my invention, I claim as new and desire to secure by Letters Patent—

The combination of the jointed wire I, having an eye upon its upper end, and a screw-thread upon its lower end, and the screw-cover $j'$, with the wire-gauze cup or pocket J, to adapt it to be suspended detachably from a hook, H, attached to the cover of a coffee or tea pot, substantially as herein shown and described.

EDMUND R. BANKS.

Witnesses:
F. A. EVELETH,
L. W. WHALEY.